(12) United States Patent
Potter et al.

(10) Patent No.: US 8,839,500 B2
(45) Date of Patent: Sep. 23, 2014

(54) EDGE CONVEYOR BELT SOLAR STRING ASSEMBLY DEVICE

(75) Inventors: David S. Potter, Danville, CA (US);
Nathan Dion Fleischer, Berkeley, CA (US); Jeffrey Paul Munoz, Oakley, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 59 days.

(21) Appl. No.: 13/368,595

(22) Filed: Feb. 8, 2012

(65) Prior Publication Data

US 2012/0198682 A1 Aug. 9, 2012

Related U.S. Application Data

(60) Provisional application No. 61/440,751, filed on Feb. 8, 2011.

(51) Int. Cl.
*H01L 31/00* (2006.01)
*B65G 47/82* (2006.01)
*F24J 2/52* (2006.01)

(52) U.S. Cl.
CPC ......... *B65G 47/82* (2013.01); *F24J 2002/5281* (2013.01); *Y02E 10/47* (2013.01); *F24J 2/5205* (2013.01)
USPC ................... 29/464; 29/822; 29/823; 29/467; 29/433; 136/244

(58) Field of Classification Search
CPC ......... B23P 19/04; B23P 19/10; B23Q 3/186; Y02E 10/50; Y02E 10/47; H01L 31/042; H01L 31/0422; H01L 31/05; H01L 31/0504; H01L 31/188
USPC ............ 29/464, 467, 822, 823, 748, 890.033, 29/430, 783, 787, 795; 438/80; 136/244, 136/249, 251, 255, 256; 52/173.3
See application file for complete search history.

(56) References Cited

U.S. PATENT DOCUMENTS

| | | | |
|---|---|---|---|
| 3,557,439 A * | 1/1971 | Dykeman | 29/430 |
| 5,355,575 A * | 10/1994 | Self | 29/430 |
| 6,058,601 A * | 5/2000 | DeKoning | 29/798 |
| 7,230,819 B2 * | 6/2007 | Muchow et al. | 361/601 |
| 2008/0236571 A1 * | 10/2008 | Keshner et al. | 126/623 |
| 2009/0205703 A1 * | 8/2009 | Umotoy et al. | 136/251 |
| 2010/0254813 A1 * | 10/2010 | Dawson et al. | 416/146 R |
| 2011/0138599 A1 * | 6/2011 | Bellacicco et al. | 29/428 |
| 2011/0198304 A1 * | 8/2011 | Wallgren | 211/41.1 |
| 2013/0122639 A1 * | 5/2013 | Degroot et al. | 438/80 |

* cited by examiner

*Primary Examiner* — David Bryant
*Assistant Examiner* — Jun Yoo
(74) *Attorney, Agent, or Firm* — Carlos L. Hanze

(57) ABSTRACT

The present invention is directed to a process for pre-assembly of a solar panel string for a solar canopy, the process comprising aligning a plurality of solar panels onto an edge conveyor, wherein belts of the edge conveyor contact and support the bottom of the plurality of solar panels at opposite longitudinal ends of each solar panel and aligning a solar panel support channel below the plurality of solar panels; and attaching the solar panel support channel to the plurality of solar panels, thereby forming a solar panel string assembly.

12 Claims, 3 Drawing Sheets

EDGE CONVEYOR BELT SOLAR STRING ASSEMBLY DEVICE

COPYRIGHT NOTICE AND AUTHORIZATION

This patent document contains material which is subject to copyright protection.

© Copyright 2011-2012. Chevron Energy Solutions Company, a division of Chevron U.S.A. Inc. All rights reserved.

With respect to this material which is subject to copyright protection. The owner, Chevron Energy Solutions Company has no objection to the facsimile reproduction by any one of the patent disclosure, as it appears in the Patent and Trademark Office patent files or records of any country, but otherwise reserves all rights whatsoever.

FIELD OF THE INVENTION

This invention relates an apparatus and method for pre-assembly of certain components of a solar canopy.

BACKGROUND OF THE INVENTION

Solar energy is a clean, renewal energy source. Photo-electro voltaic cell technology is increasing rapidly and makes installation of solar collector panels housing the photo-electro voltaic cells more and more economically feasible. Beyond the photo-electro voltaic cell technology itself are the problems of placement and support of the solar collector panels. Large numbers of solar collector panels must be assembled in series to achieve useful power production. In remote areas these may be placed on the ground without interfering with land use. In more developed areas, it is desirable to place the solar collector panels such that the land also be used for other purposes, e.g., for parking lots, school/office hallways, playgrounds, or sports fields. To achieve this requires an elevated structure to support the solar collector panels.

In prior known systems, installation costs amount to around 25% of the overall cost of a solar parking shade installation. These installation cost includes the cost to place modules on a rack, wire the modules together and to a combiner box, bolt the modules in place, and place the support structure on a parking shade structure. These costs often amount to almost the actual panel cost themselves due to the lack of ability to achieve assembly efficiency as well as the need in governmental markets to use union labor.

An additional deficiency in known methods/systems for solar canopy installation is that the size of solar modules used is limited to the size module a contractor can physically carry. The installation process is also cumbersome and dangerous due to work on nonstandard sites and at an elevated height.

It is desirable to have a method and system which overcomes the deficiencies of known systems. The instant invention provides such a solution.

SUMMARY OF THE INVENTION

The invention in one embodiment includes a process for pre-assembly of a solar panel string for a solar canopy, the process comprising aligning a plurality of solar panels onto an edge conveyor, wherein 2 belts of the edge conveyor contact and support the respective bottom of each solar panel of the plurality of solar panels, each belt at opposite longitudinal ends of each solar panel, thereby leaving working space between the 2 belts and below the plurality of solar panels; aligning a solar panel support channel below the plurality of solar panels; and attaching the solar panel support channel to the plurality of solar panels, thereby forming a solar panel string assembly.

The invention in another embodiment includes a system for pre-assembly of a solar panel string for a solar canopy, the system comprising an edge conveyor having 2 parallel belts for supporting the bottom of each respective solar panel of a plurality of solar panels at opposite longitudinal ends of each solar panel, and a lift mechanism for lifting a solar panel support channel from below the plurality of solar panels to a bottom portion of each respective solar panel of the plurality of solar panels, for attachment of the solar panel support channel to the plurality of solar panels, thereby forming a solar panel string assembly.

These and other features and advantages of the present invention will be made more apparent through a consideration of the following detailed description of preferred embodiments of the invention. In the course of this description, frequent reference will be made to the attached drawings.

DETAILED DESCRIPTION OF PREFERRED EMBODIMENTS

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

As used in this specification and claims, the "solar panel support channels" comprise "Z"-shaped sheet metal, i.e., "Zee-channels" or "Z-channels", "C"-shaped sheet metal, i.e., "Cee-channels" or "c-channels", or standard beams, bars, and other suitable support members.

Figure 1:
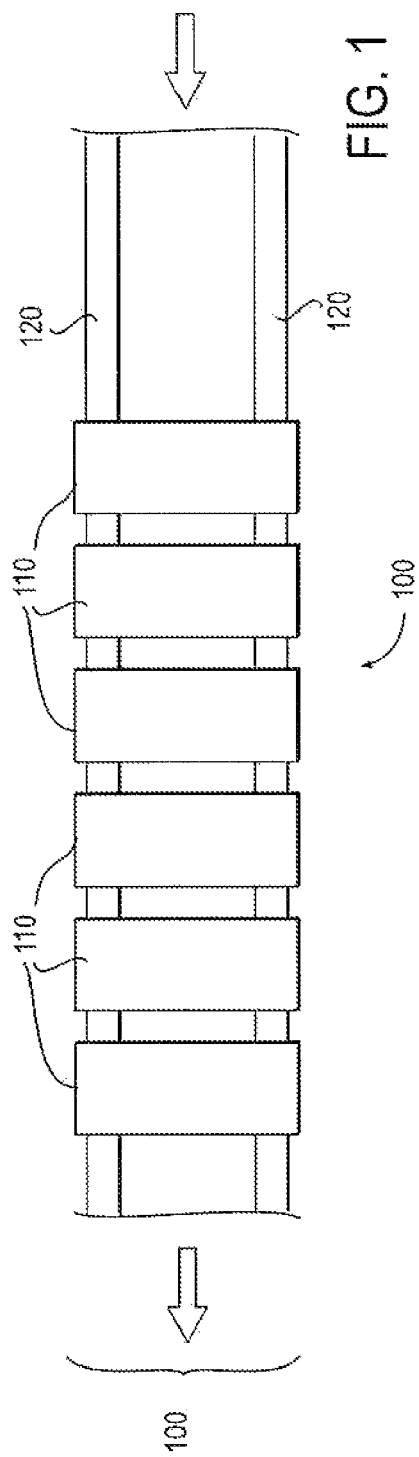
FIG. 1 is a top view of one embodiment of the present invention depicting a plurality of solar panels on a 2 belt, edge conveyor system.

FIG. 1 is a top view of one embodiment of the present invention depicting a plurality of solar panels 110 on a two belt, edge conveyor system 100. An edge conveyor system 100 has two rotating belts 120 spaced at a width sufficient to support solar panels 110 and having length sufficient to support several solar panels 110 at one time, e.g., 6-20 solar panels. The belts 120 move in one direction with an on-loading end and off-loading end for loading the solar panels 110. Loading the solar panels 110 on belts 120 may be done manually, robotically, or via any other known means. When the desired number of solar panels 110 are loaded onto edge conveyor system 100 the assembly process can move to the next step.

Figure 2:
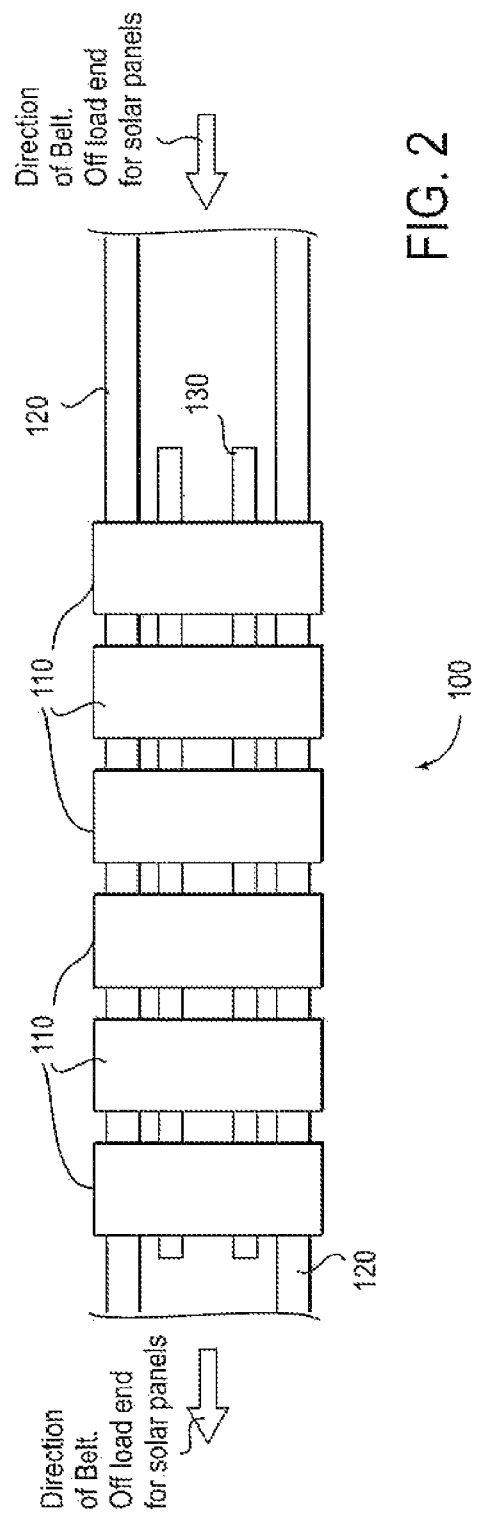
FIG. 2 is a top view of one embodiment of the present invention depicting 2 solar panel support channels being aligned with and below a plurality of solar panels on a 2 belt, edge conveyor system, in preparation for attachment of the 2 solar panel support channels to the respective bottoms of the solar panels of the plurality of solar panels.

With reference to FIG. 2, two solar panel support channels 130 are aligned with and below the plurality of solar panels 110 on the edge conveyor system 100 in preparation for attachment of the solar panel support channels 130 to the respective bottoms of the below solar panels of the plurality of solar panels 110. The alignment may be manually or robotically or any other known means. In one embodiment the bottom portion of solar panels 110 have integral or attached alignment tabs for aligning the solar panel support channels 130.

Figure 3:
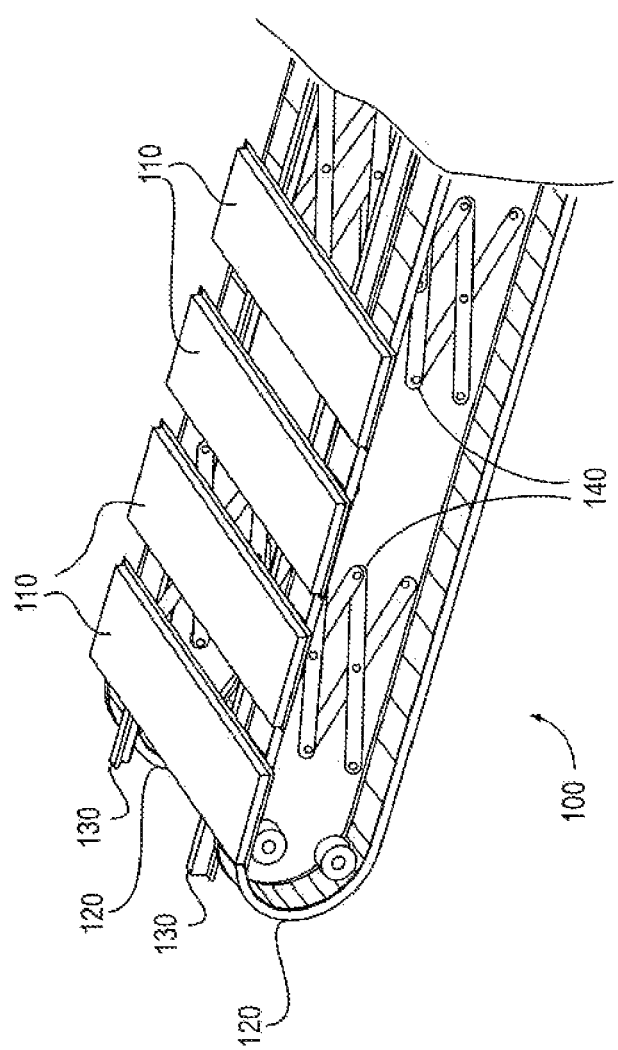
FIG. 3 is a perspective view in one embodiment of the present invention depicting a plurality of solar panels on edge conveyor belts and the lifting into place (via a scissor lift) for attachment of solar panel support channels to a plurality of solar panels.

With reference to FIG. 3, lift mechanism 140 consists of, e.g., one or more scissor lifts for raising the plurality of solar panels 110 to make attachment of the solar panel support channels 140 more accessible for manual or machine attachment.

Figure 4:
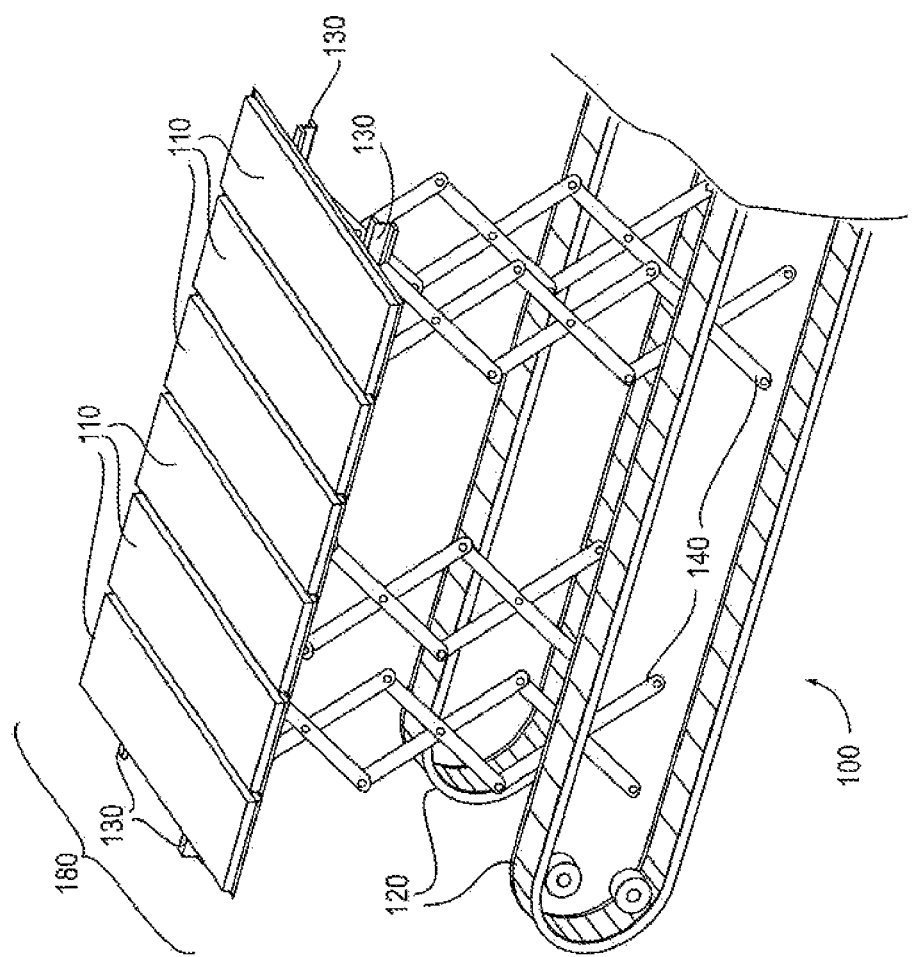
FIG. 4 is a perspective view in one embodiment of the present invention depicting lifting (via a scissor lift) a completed solar panel assembly from the edge conveyor belts for transport to job site.

With reference to FIG. 4 when lift mechanism 140 is extended to provide room under the solar panels for working, other components may also be attached to the assembly such as alternating current inverter (not shown) and electrical connections between the panels can be completed (not shown). Alternately the attachment of solar panel support channels 130 and other components may be done without extending the lift mechanism 140. Lift mechanism 140 can be used for removing the finished solar panel assembly 180 from the edge conveyor belts 120 for transport to job site.

What has been described above includes example embodiments of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as that term is interpreted as a transitional word in a claim.

What is claimed is:

1. A process for pre-assembly of a solar panel string for a solar canopy, the process comprising:
  (a) aligning a plurality of solar panels onto an edge conveyor, wherein 2 belts of the edge conveyor contact and support a bottom of each respective solar panel of the plurality of solar panels, each belt at opposite longitudinal ends of each solar panel, thereby leaving working space between the 2 belts and below the plurality of solar panels;
  (b) aligning a first solar panel support channel below the plurality of aligned solar panels while the plurality of aligned solar panels is on the edge conveyor by raising the first solar panel support channel until it contacts a bottom of each solar panel of the plurality of solar panels, wherein the first solar panel support channel runs across an entire cross-section of each solar panel of the plurality of solar panels; and
  (c) attaching the first solar panel support channel to the plurality of solar panels, thereby forming a solar panel string assembly.

2. The process described in claim 1, further comprising electrically connecting the plurality of solar panels to one another in series.

3. The process described in claim 1, further comprising attaching a direct current to alternating current inverter to the first solar panel support channel and electrically connecting the inverter to the plurality of solar panels.

4. The process described in claim 1, wherein the first solar panel support channel is a "Z" channel.

5. The process described in claim 1, wherein the first solar panel support channel is a "C" channel.

6. The process described in claim 1, wherein the plurality of solar panels is from about 4 to about 20 solar panels.

7. The process described in claim 1, further comprising manufacturing the first solar panel support channel at a solar canopy construction site using rolled sheet metal form extrusion.

8. The process described in claim 1, further comprising lifting the solar panel string assembly during construction via suction cups attached to at least one of the solar panels in the solar panel string assembly.

9. The process described in claim 1, wherein the first solar panel support channel is attached to the plurality of solar panels via an attachment means selected from gluing, riveting, bolting, welding or mixtures thereof.

10. The process described in claim 1, the process further comprising aligning a second solar panel support channel below the plurality of solar panels, wherein
  the second solar panel support channel runs across an entire cross-section of each solar panel of the plurality of solar panels.

11. The process described in claim 10, wherein
  the first solar panel support channel is positioned at a first longitudinal end portion of each solar panel of the plurality of solar panels, and
  the second solar panel support channel is positioned at a second longitudinal end portion of each solar panel of the plurality of solar panels.

12. The process described in claim 10, further comprising:
  lifting the solar panel string assembly by raising a lift mechanism.

* * * * *